UNITED STATES PATENT OFFICE.

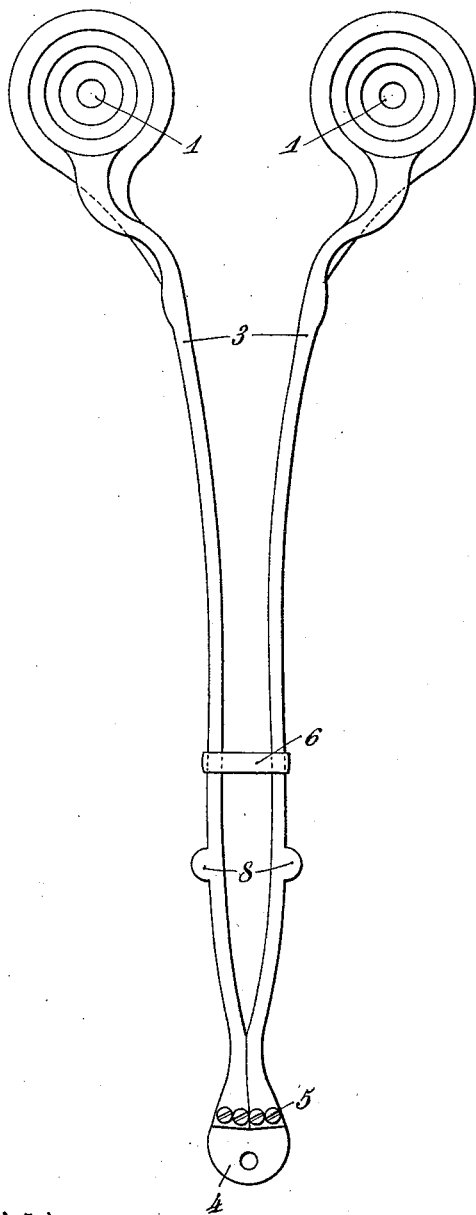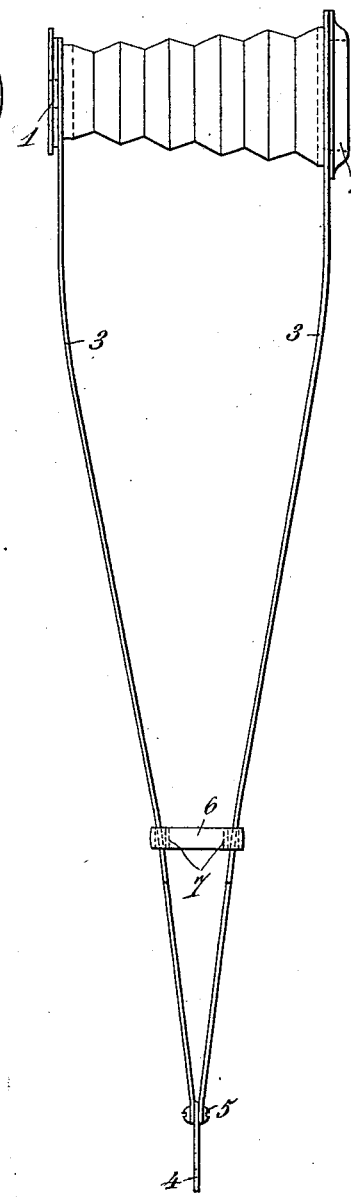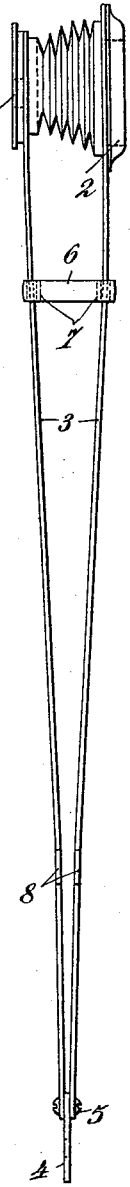

ADOLPHE STADELMANN, OF PARIS, FRANCE, ASSIGNOR TO SOCIETE AD. & ED. DERAISME, OF PARIS, FRANCE, A CORPORATION OF FRANCE.

HAND-GLASSES COMBINED WITH A DARK CHAMBER.

1,098,186.  Specification of Letters Patent.  Patented May 26, 1914.

Application filed March 12, 1913. Serial No. 753,813.

*To all whom it may concern:*

Be it known that I, ADOLPHE STADELMANN, gentleman, a citizen of the Republic of France, residing at 14$^{bis}$ Rue des Montiboeufs, Paris, France, have invented new and useful Improvements in Hand-Glasses Combined with a Dark Chamber, of which the following is a specification.

This invention relates to lorgnettes and to improved means for mounting the objectives and eye pieces. Each eye piece and each objective is provided with an arm, the arms converging at a common point, and means are provided for varying the relation of the arms with reference to each other, thereby varying the distance between the corresponding lenses.

In the accompanying drawing forming part of this application, Figure 1 is a view of the device in elevation. Fig. 2 is a view also in elevation but from a different angle, and Fig. 3 is a view in elevation, showing the device closed.

The eye pieces and objectives of the two instruments are indicated respectively by 1 and 2, these lenses being connected by opaque collapsible devices. A plurality of arms 3 are connected with the instruments by being secured to the mounting means for each lens. These arms converge and are connected by means of a screw 5 to any suitable member 4. A sliding member 6 is carried by the several arms, and constitutes means for varying their position with reference to each other, and for closing the instrument when not in use. This sliding member 6 may be of rectangular formation, one of the arms being disposed in each corner of the rectangle. The side bars of this member are indicated by 7, and stop members carried by the arms, for limiting the movement of member 6, are designated by the numeral 8.

It will be understood that in the use of the device the sliding member 6 is placed in such position on arms 3 as circumstances may require in order to place the lenses in proper relation with each other.

What I claim is:

1. In a device of the class described, a plurality of optical instruments, a separate arm connected with each end of each instrument, said arms converging at their outer ends, and means for varying the distance between the arms.

2. In a device of the class described, a plurality of optical instruments, a separate arm connected at one end of each instrument, said arms converging at their outer ends, and slidable means for varying the distance between the arms.

3. In a device of the class described, a plurality of optical instruments, an arm connected with each end of each instrument, the arms converging to a given point, and slidable means for varying the distance between the arms.

4. In a device of the class described, a plurality of optical instruments, each comprising a plurality of lenses, the lenses being movable toward and away from each other, a plurality of arms converging to a given point, means for connecting each arm with a lens, and means for varying the position of the arms with reference to each other and for holding the arms in an adjusted position, said means last mentioned comprising a band surrounding the arms.

5. In a device of the class described, a plurality of optical instruments, each comprising a plurality of lenses, the lenses being movable toward and away from each other, a plurality of arms converging to a given point, means for connecting the arms with the lenses, slidable means for varying the position of the arms with reference to each other and stop members on the arms for limiting the movable means.

In testimony whereof I affix my signature in presence of two witnesses.

ADOLPHE STADELMANN.

Witnesses:
JULES BELE,
LUCIEN MEMMINGER.

Copies of this patent may be obtained for five cents each, by addressing the "Commissioner of Patents, Washington, D. C."